(12) United States Patent
Quinzaños Montes

(10) Patent No.: US 11,001,702 B2
(45) Date of Patent: May 11, 2021

(54) ALTERNATIVE CONSTRUCTION SYSTEM WITH ARCHITECTURAL ELEMENTS MANUFACTURED WITH RECYCLED PLASTIC AND THE FORMULATION OF THE MATERIAL THEREOF

(71) Applicant: Big Belly Mèxico S.A. de C.V., Mexico City (MX)

(72) Inventor: Luis Enrique Quinzaños Montes, Mexico City (MX)

(73) Assignee: Big Belly Mèxico S.A. de C.V., Mexico City (MX)

( * ) Notice: Subject to any disclaimer, the term of this patent is extended or adjusted under 35 U.S.C. 154(b) by 31 days.

(21) Appl. No.: 16/382,854

(22) Filed: Apr. 12, 2019

(65) Prior Publication Data

US 2020/0255638 A1    Aug. 13, 2020

(30) Foreign Application Priority Data

Feb. 11, 2019    (MX) .................... MX/a/2019/001727

(51) Int. Cl.
 *C08L 23/06*    (2006.01)
 *E04B 5/00*    (2006.01)
 *E04C 1/40*    (2006.01)

(52) U.S. Cl.
 CPC ............... *C08L 23/06* (2013.01); *E04C 1/24* (2013.01); *E04C 1/40* (2013.01); *C08L 2205/025* (2013.01); *C08L 2205/035* (2013.01); *C08L 2207/066* (2013.01); *C08L 2207/20* (2013.01)

(58) Field of Classification Search
 USPC .......................................................... 521/40
 See application file for complete search history.

(56) References Cited

U.S. PATENT DOCUMENTS

| | | | | |
|---|---|---|---|---|
| 5,022,985 A | * | 6/1991 | Nugent | B29B 17/02 |
| | | | | 209/172.5 |
| 5,030,662 A | * | 7/1991 | Banerjie | C08J 11/06 |
| | | | | 521/43.5 |
| 6,329,437 B1 | | 12/2001 | Vincent et al. | |
| 6,723,759 B2 | * | 4/2004 | Takenaka | C08J 11/06 |
| | | | | 521/40.5 |

FOREIGN PATENT DOCUMENTS

| | | |
|---|---|---|
| CN | 106243497 A | 12/2016 |
| CN | 106280361 A | 1/2017 |

* cited by examiner

*Primary Examiner* — Terressa Boykin
(74) *Attorney, Agent, or Firm* — Shumaker, Loop & Kendrick, LLP

(57) ABSTRACT

The herein application discloses an alternative construction system for buildings, facilities, accessories and products, with architectural elements of easy assembly, manufactured with recycled plastic improved materials, as well as the formulation of the material thereof.

42 Claims, 3 Drawing Sheets

ALTERNATIVE CONSTRUCTION SYSTEM WITH ARCHITECTURAL ELEMENTS MANUFACTURED WITH RECYCLED PLASTIC AND THE FORMULATION OF THE MATERIAL THEREOF

FIELD OF THE INVENTION

The herein invention refers to an alternative construction system for buildings, facilities, accessories and products, with architectural elements of easy assembly, manufactured with improved materials made of recycled plastic, as well as the formulation of the material that comprises said architectural elements.

BACKGROUND

Traditional construction systems such as, clay bricks, concrete bricks, ceramic bricks, concrete panels, steel girders, gypsum, lime, cement, concrete, and wood, have some disadvantages such as that they can be worn with humidity, they are vulnerable to bugs, rodents and microorganisms, they can corrode, they propagate fire, they require adhesive or mortar for their assembly, they have a prolonged assembly time, a limited useful life, they are expensive and unfriendly with the environment.

On the other hand, human activity produces more than 80 million tons of plastic waste a year worldwide, which accumulates in aquifers and soils through the planet. Said waste can take up to a thousand years to break down or decompose.

In this context, recycling activities have been an excellent option for years to reduce the amount of plastic waste and to reuse them as raw materials to manufacture materials and useful objects for daily activities, thus minimizing their environmental impact. Therefore, it is more and more important to obtain recycled materials to manufacture environmentally compatible raw materials.

Currently, due to the worldwide economic growth rate, the construction industry needs a growing amount of starting materials for its own operation, e.g., it is estimated that, on average, more than two tons of raw material are needed per square meter of building.

In addition, the formulations of the recycled plastic must be appropriate to form a construction element that meets the durability, resistance, and safety demands that are required in the construction industry.

In the state of the art, some examples of plastic waste formulations that are used as construction materials can be found, e.g., in the documents MX 222,419 B, CN 106,280, 361 A, and CN 106,243,497 A; however, none of the hereinbefore mentioned documents solve the problem of providing alternative construction systems with architectural elements of easy assembly, manufactured with improved recycled plastic materials, as well as the formulation thereof.

Thus, there is a need to provide architectural elements of easy assembly manufactured with improved recycled plastic materials to be used in alternative construction systems used to build buildings, facilities, shelters, accessories, and housing products such as dividing walls, window frames, pavers, pillars, fence-posts, tablets, bricks, baffles, blocks, floors, pavements, or any other useful object for construction, as well as the formulation of the improved materials.

SUMMARY

The objective of the herein invention is to provide an alternative building system to build buildings, facilities, shelters, accessories, and housing products such as dividing walls, window frames, pavers, pillars, fence-posts, tablets, bricks, baffles, blocks, floors, pavements, or any other useful object for construction, that consists on architectural elements of easy assembly manufactured with recycled plastic improved materials that transform the problem of the plastic's degradation time into important features such as resistance and durability.

Another main embodiment of the herein invention is to provide the formulation of the improved material based on recycled plastic composing the architectural elements.

A first embodiment of the herein invention consists on a construction system to build buildings, facilities, accessories, and products that do not require maintenance, with architectural elements of easy assembly, manufactured with improved materials based on recycled or recovered plastic.

A preferred embodiment of the herein invention consists on a construction system for buildings, facilities, accessories, and products, with architectural elements of easy assembly, manufactured with improved materials based on recycled or recovered plastic that does not require maintenance, and in addition, they have, a long useful life, resistance to the outdoors, resistance to humidity, immunity to insects, immunity to rodents, immunity to microorganisms; they are anticorrosive, decomposition proof, thermal isolating, acoustic isolating, electric isolating, impact resistant, traction and bending resistant, fireproof, and eco-friendly.

In another embodiment of the herein invention, the construction system for buildings, facilities, accessories, and products, with architectural elements of easy assembly, manufactured with improved materials based on recycled or recovered plastic that does not require maintenance, has an easy and fast installation, ease of fabrication, it can be cut, drilled, nailed or pierced, and be plastered, painted, or plated.

In another embodiment of the herein invention, the construction system for buildings, facilities, accessories, decoration, and products, with architectural elements of easy assembly, manufactured with improved materials based on recycled or recovered plastic that does not require maintenance, does not require skilled workforce for its construction.

Particularly, the other main embodiment of the herein invention includes a formulation that comprises the following recycled plastic components in different proportions:
Polyethylene
ABS (Acrylonitrile Butadiene Styrene)
Calcium Carbonate
Polypropylene In another embodiment of the invention, the components of the recycled plastic of the formulation can also comprise polyvinyl chloride (PVC), polystyrene, polyethylene terephthalate (PET), expanded polystyrene (PS), biaxially oriented polypropylene (BOPP), plastics that can be suitable for the recycling cycle and combinations thereof.

In any of the embodiments of the invention, the assembly may produce low cost products with prolonged useful life, such as housing buildings, dividing walls, pavers, pillars, fence-posts, tablets, bricks, baffles, window frames, blocks, floors, pavements, or any other useful object for construction.

BRIEF DESCRIPTION OF THE FIGURES

The following figures are included to illustrate certain aspects of the herein invention, and they are not exclusive modes. The topic that is disclosed is capable of modifications, alterations, combinations, and considerable equivalents in form and function, as will happen to those skilled in the art and that have the benefit of this disclosure.

DETAILED DESCRIPTION

Figure 1:
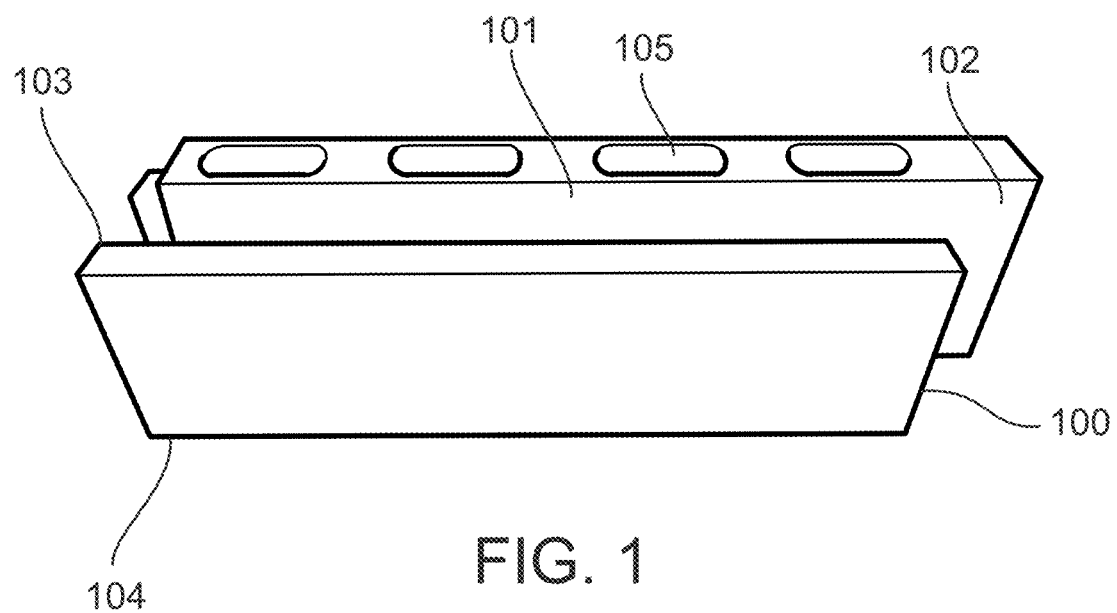
FIG. 1 illustrates the frontal view of the architectural element of plastic block that is the main element of the construction system.

According to FIG. 1, the plastic blocks (100) that are main elements for the construction system, are composed by 4 basic elements that make them assemble in a one-way direction with a male and female system, the male part consists on the upper (101) and side (102) slip-on connectors, and the female part consists on the bottom (103) and side (104) wings.

In a preferred embodiment of the invention, the plastic blocks (100) can have from one to four vertical openings or holes (105) that are used to set electric and hydraulic installations (wiring or tubing) internally, creating a higher quality aesthetic result since they are hidden within the construction.

In a non-limiting embodiment of the invention, the male dimensions are 0.50 meters (m) (1.64 feet) long, 0.10 m (0.32 feet) high, with a slip-on connector that is 0.03 m (0.098 feet) long, 0.10 m (0.32 feet) high, and 0.03 m (0.098 feet) wide; the female dimensions are 0.47 meters (m) (1.54 feet) long, 0.10 m (0.32 feet) high, with a slip-on connector that is 0.03 m (0.098 feet) long, 0.10 m (0.32 feet) high and 0.02 m (0.065 feet) wide.

In another non-limiting embodiment of the invention, the male dimensions are 0.25 meters (m) (0.82 feet) long, 0.10 m (0.32 feet) high, with a slip-on connector that is 0.03 m (0.098 feet) long, 0.10 m (0.32 feet) high, and 0.03 m (0.098 feet) wide; the female dimensions are 0.22 meters (m) (0.72 feet) long, 0.10 m (0.32 feet) high, with a slip-on connector that is 0.03 m (0.098 feet) long, 0.10 m (0.32 feet) high, and 0.02 m (0.065 feet) wide.

In another non-limiting embodiment of the invention, the dimensions of the vertical openings or holes (105) are 0.06 (0.19 feet) and/or 0.07 m (0.22 feet) long.

Figure 2:
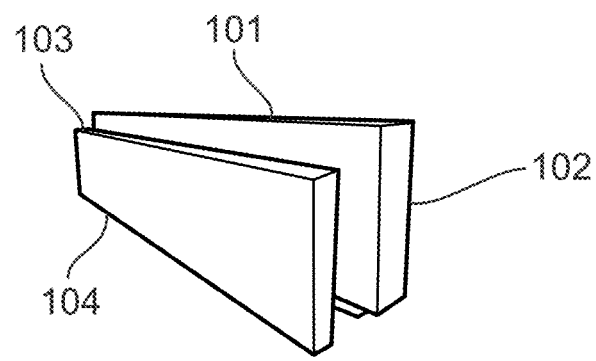
FIG. 2 illustrates the right-side perspective view of the architectural element of plastic block.
Figure 3:
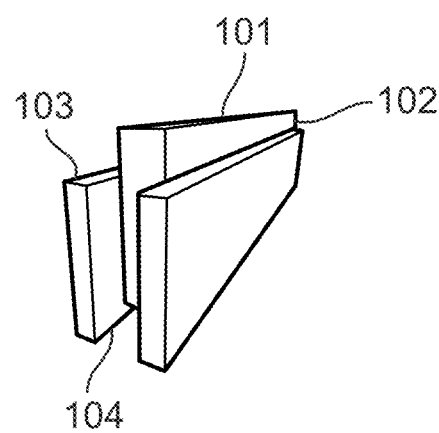
FIG. 3 illustrates the left-side perspective view of the architectural element of plastic block.

FIGS. 2 and 3 are the left and right side frontal perspectives of the plastic blocks that are easily assembled without mortar, additives, sealants, or adhesives, which eases the wall assembly without the need of qualified workforce, both consist on a male-female system, the male part consists on the upper (101) and side (102) slip-on connectors, and the female part consists on the bottom (103) and side (104) wings.

In an embodiment of the invention, the plastic blocks assemble by sliding in one direction, matching the superior (101) and side (102) slip-on connectors of a block with the bottom (103) and side (104) wings until the ends of each block match, to make a male-female contact and for them to remain assembled without mortar, additives, sealants, or adhesives.

Figure 4:
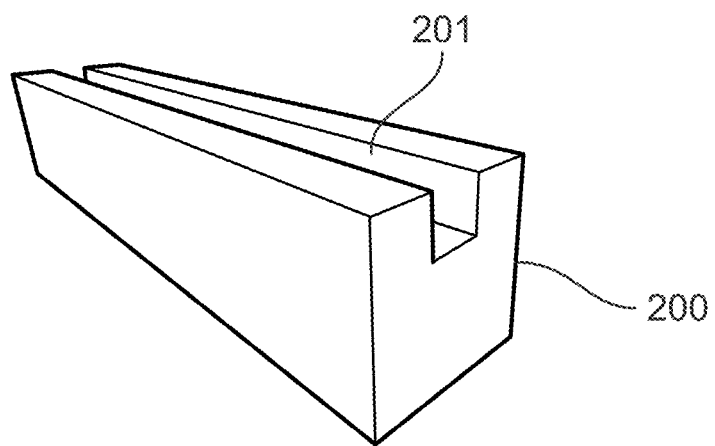
FIG. 4 shows a right-side perspective view of Jamb 1.

FIG. 4 shows Jamb 1 (200), that is an embodiment of the plastic block that is used as a window connector, which rests on the superior slip-on connector of the blocks and consists on a slot or guide (201), which is also to connect wall, window, and door openings.

In a non-limiting embodiment of the invention, the dimensions of the Jamb 1 (200) are 2.20 m (7.21 feet) long, 0.10 m (0.32 feet) high.

Figure 5:
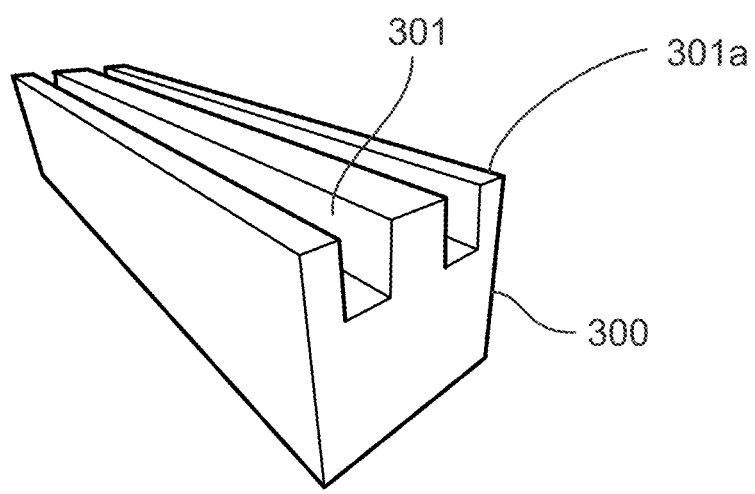
FIG. 5 shows a right-side perspective view of Jamb 2.

FIG. 5 shows Jamb 2 (300), which is a plastic block embodiment that works as a base for the beginning of the construction of a wall, through its two slots or guides (301 and 301a) the plastic block must fit using its lateral sides.

Figure 6:
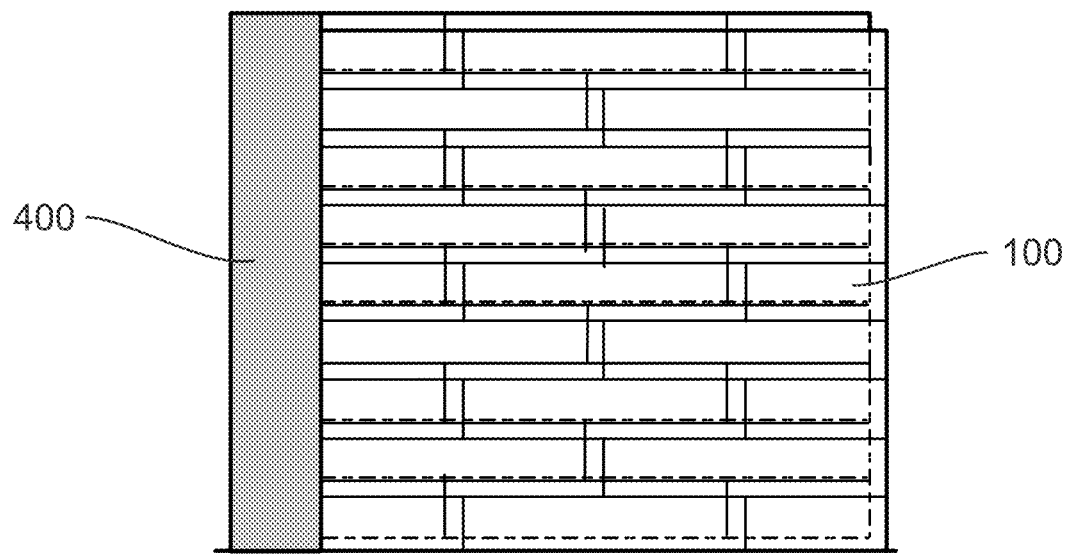
FIG. 6 shows a frontal view of the assembly of the architectural element assemble.

FIG. 6 shows a preferred embodiment to assemble the plastic blocks to form a partition unit joined to a structural column (400).

Figure 7:
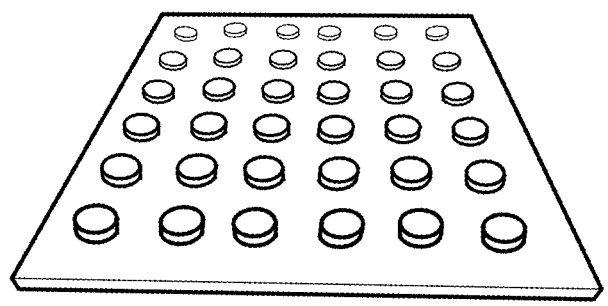
FIG. 7 illustrates a perspective frontal view of a plastic paver.

FIG. 7 illustrates a plastic paver, that is a prefabricated recycled plastic unit with the formulation of the invention, suitable for floor and pavement construction in general, and particularly to construct floors and pavements for light vehicular and pedestrian traffic.

These units may be smooth or may have different tactile finishes on their exposed face, grids, cylinders, guides, lines, and any other geometric or non-geometric shape.

In a non-limiting mode of the invention, the paving stones have dimensions of 0.40 m (1.31 feet) long, 0.40 m (1.31 feet) wide, and 0.05 m (0.16 feet) high.

In another embodiment of the invention, the paving stone is rectangular, circular, triangular, hexagonal, pentagonal, and any and other geometric shape.

Figure 8:
FIG. 8 illustrates a side view of the paver.

FIG. 8 illustrates a preferred mode of a side view of the paver.

The formulation of the architectural elements has as main components the low-density polyethylene in a laminated and firm form in different proportions, ABS recovered from technological waste, calcium carbonate coated with calcium stearate that is included on the formulation as Mesh 200, and low density polypropylene in rigid form, these materials are obtained from plastic waste that comes from the group comprising, bottles, trays, packages, covers, lids, and any other plastic object that is suitable for recycling.

WORKING EXAMPLES

To provide a better understanding of the herein invention, the following examples of certain aspects of some embodiments of the invention are provided. The following examples are not limitative nor define the whole scope of the invention.

Example 1. Formulation 1 of the Material that Comprises the Architectural Elements

| PARTICIPATION | PRODUCT | TYPE | INITIAL PRESENTATION |
|---|---|---|---|
| 36.0% | Polyethylene | Low density | Laminated |
| 16.0% | ABS | Not applicable | Technological waste |
| 18.0% | Calcium carbonate | Coated with calcium stearate | Mesh 200 |
| 6.0% | Polyethylene | Low density | Rigid |
| 24.0% | Polypropylene | Low density | Rigid |

Example 2. Formulation 2 of the Material that Comprises the Architectural Elements

| PARTICIPATION | PRODUCT | TYPE | INITIAL PRESENTATION |
|---|---|---|---|
| 39.0% | Polyethylene | Low density | Laminated |
| 18.0% | ABS | Not applicable | Technological waste |
| 20.0% | Calcium carbonate | Coated with calcium stearate | Mesh 200 |
| 3.0% | Polyethylene | Low density | Rigid |
| 20.0% | Polypropylene | Low density | Rigid |

Example 3. Formulation 3 of the Material that Comprises the Architectural Elements

| PARTICIPATION | PRODUCT | TYPE | INITIAL PRESENTATION |
|---|---|---|---|
| 36.96% | Polyethylene | Low density | Laminated |
| 17.39% | ABS | Not applicable | Technological waste |
| 19.57% | Calcium carbonate | Coated with calcium stearate | Mesh 200 |
| 4.35% | Polyethylene | Low density | Rigid |
| 21.74% | Polypropylene | Low density | Rigid |

The percentages described in the examples 1, 2, and 3 are defined in weight (% wt.), based on the total weight of the formulation.

As it is used in the herein document, the term "system" refers to the collection of coordinated elements or parts that constitute the herein invention. Said collection can allow variations and changes that fit within the scope of the herein invention.

As it is used in the herein document, the term "assemble", "assembly", or "assembling" or their derivatives, refers to the construction of two or more plastic blocks by joining and perfectly adjusting the pieces or elements that form it.

As it is used in the herein document, the term "recycle" or "recover" refers to subjecting plastic materials used in one or many occasions to a transformation process or exploitation process so they can be used again as architectural elements (plastic blocks).

As it is used in the herein document, the term "improved materials" refers to a plastic block that contains specific amounts of polyethylene, ABS, calcium carbonate, and polypropylene.

As it is used in the herein document, the term "initial" refers to the presentation of the initial plastic materials before they are recycled and turned into architectural elements (plastic blocks).

As it is used in the herein document, the term "architectural elements" refers to a plastic block in a shape as any of the ones described in the herein invention of easy assembly, manufactured with improved materials made of recycled plastic that contains specific polyethylene, ABS, calcium carbonate, and polypropylene amounts to be used in alternative systems for the construction of buildings, facilities, shelters, accessories, and housing products such as dividing walls, pavers, pillars, fence-posts, tablets, bricks, baffles, blocks, floors, pavements, or any other useful object for construction.

ADDITIONAL OBSERVATIONS

Therefore, the herein invention is well adapted to meet the purposes and benefits mentioned, as well as those inherent to them. The particular modes disclosed hereinbefore are merely illustrative, since the herein invention can be modified and practiced in different but equivalent manners obvious to those skilled in the art that have the benefit of the teachings of this document. On the other hand, it is not intended to limit the details of the features provided in the herein document, aside from the ones described in the following claims. Thus, it is obvious that the particular illustrative modes disclosed hereinbefore can be altered, combined, or modified, and that all those variations are considered within the scope and spirit of the herein invention. The invention that is disclosed illustratively in this document, can be practiced appropriately upon the absence of any element that is not specifically disclosed in the herein document and/or any optional element that is disclosed in the herein document. While the formulations and methods are described in terms of "that comprises", "that contains", or "that includes", different components or steps, the formulations and methods can also "consist essentially of" or "consist on" the different components and steps. The numbers and ranges disclosed hereinbefore can vary in some amount. Every time a numerical range with an inferior limit and a superior limit is disclosed, any number and any range included that fall into the range are specifically disclosed. The terms of the claims have their plain and ordinary meaning, unless the contrary is explicitly and clearly defined by the patentee. In addition, the indefinite articles such as "an" or "a", as they are used in the claims, are defined in this document to refer to one or more than one of the elements introduced. If there is a conflict with the uses of a word or term in this descriptive memory, and one or more patents, or other documents that can be added to this document by reference, the definitions that are consistent with this description must be adopted.

What is claimed is:

1. A formulation comprising recycled plastic therein, the formulation comprising:
   a. polyethylene;
   b. Acrylonitrile Butadiene Styrene (ABS);
   c. a filler comprising calcium carbonate;
   d. polypropylene,
   wherein the polyethylene is in an amount within the range from 3 to 39% wt, based on the total weight of the formulation; the ABS is in an amount in the range from 16 to 18% wt, based on the total weight of the formulation; the calcium carbonate is in an amount in the range from 18 to 20% wt, regarding the total weight of the formulation; and the polypropylene is in an amount in the range from 20 to 24% wt, based on the total weight of the formulation, wherein the polyethylene, ABS and polypropylene are recycled and wherein calcium carbonate is included in the formulation as a Mesh 200.

2. The formulation of claim 1, wherein an initial polyethylene is in a laminated and rigid form in a different ratio.

3. The formulation of claim 1, wherein an initial ABS is recovered from technological waste.

4. The formulation of claim 1, wherein the initial calcium carbonate is partially or completely coated with calcium stearate.

5. The formulation of claim 1, wherein the polyethylene, ABS, calcium carbonate, and polypropylene are obtained from plastic waste.

6. The formulation of claim 5, wherein plastic waste is obtained from a group comprising bottles, trays, packages, covers, lids, and any other recyclable plastic object.

7. The formulation of claim 1, wherein the amount of polyethylene is 36.96% wt. based on the total weight of the formulation, when in a laminated form.

8. The formulation of claim 1, wherein the amount of polyethylene is 4.35% wt. based on the total weight of the formulation, when in a rigid form.

9. The formulation of claim 1, wherein the amount of ABS is 17.39% wt. based on the total weight of the formulation.

10. The formulation of claim 1, wherein the amount of calcium carbonate is 19.57% wt. based on the total weight of the formulation.

11. The formulation of claim 1, wherein the amount of polypropylene is 21.74% wt. based on the total weight of the formulation.

12. The formulation of claim 1, wherein the polyethylene is selected from high density polyethylene, low density polyethylene, or combinations thereof.

13. The formulation of claim 12, wherein the polypropylene is selected from high density polypropylene, low density polypropylene, or combinations thereof.

14. The formulation of claim 1, wherein the formulation is configured for manufacturing of alternative construction systems for buildings, facilities, shelters, accessories, and housing products including partitions, pavers, pillars, fenceposts, tablets, bricks, baffles, window frames, blocks, floors, pavements, or any other construction object.

15. The formulation of claim 1, wherein the formulation is configured for a construction system for buildings, facilities, accessories, and products with architectural elements not requiring maintenance, and having outdoor durability, resistance to humidity, immunity to insects, immunity to rodents, immunity to microorganisms; and anticorrosive properties, decomposition proof, thermal isolating, acoustic isolating, electric isolating, impact resistant, traction and bending resistant, fireproof, and eco-friendly properties.

16. The formulation of claim 1, wherein the formulation is configured for manufacturing of accessories products for easy and fast installation, ease of fabrication, that can be cut, drilled, nailed or pierced, and be plastered, painted, or plated.

17. A construction system that is manufactured with recycled plastic formulation, that comprises:
   at least an architectural piece;
   at least a Jamb 1;
   at least a Jamb 2; and
   at least a paver;
   wherein the at least an architectural piece, the at least a Jamb 1, the at least a Jamb 2, and the at least a paver; are manufactured with polyethylene, Acrylonitrile Butadiene Styrene (ABS), calcium carbonate and polypropylene,
   wherein the polyethylene is in an amount in the range from 3 to 39% wt., based on the total weight of the formulation; the ABS is in an amount in the range from 16 to 18% wt., based on the total weight of the formulation; the calcium carbonate is in an amount in the range from 18 to 20% wt., based on the total weight of the formulation; and the polypropylene is in an amount in the range from 20 to 24% in weight, based on the total weight of the formulation.

18. The construction system of claim 17, wherein the at least an architectural piece comprises of four basic elements, wherein the four basic elements comprise an upper slip-on connector, a side slip-on connector, a bottom wing and a side wing.

19. The construction system of claim 18, wherein the four basic elements of the at least an architectural piece are assembled with the at least a Jamb 1, the at least a Jamb 2, and the at least an architectural piece in a one-way direction.

20. The construction system of claim 19, wherein the architectural piece comprises a male system that has the upper and side slip-on connectors.

21. The construction system of claim 19, wherein the architectural piece comprises a female system that has the bottom and side wings.

22. The construction system of claim 17, wherein the dimensions of the male system of the architectural piece are 0.50 meters (m) (1.64 feet) long, 0.10 m (0.32 feet) high, with a slip-on connector that is 0.03 m (0.098 feet) long, 0.10 m (0.32 feet) high, and 0.03 m (0.098 feet) wide; the dimensions of the female system of the architectural piece are 0.47 meters m (1.54 feet) long, 0.10 m (0.32 feet) high, with a slip-on connector that is 0.03 m (0.098 feet) long, 0.10 m (0.32 feet) high and 0.02 m (0.065 feet) wide.

23. The construction system of claim 17, wherein the dimensions of the male system of the architectural piece are 0.25 meters (m) (0.82 feet) long, 0.10 m (0.32 feet) high, with a slip-on connector that is 0.03 m (0.098 feet) long, 0.10 m (0.32 feet) high, and 0.03 m (0.098 feet) wide; the dimensions of the female system of the architectural piece are 0.22 meters m (0.72 feet) long, 0.10 m (0.32 feet) high, with a slip-on connector that is 0.03 m (0.098 feet) long, 0.10 m (0.32 feet) high, and 0.02 m (0.065 feet) wide.

24. The construction system of claim 17, wherein the architectural piece further comprises from one to four vertical openings or holes.

25. The construction system of claim 17, wherein the at least an architectural piece, the at least a Jamb 1, and the at least a Jamb 2 are assembled without mortar, additives, sealants, or adhesives.

26. The construction system of claim 25, wherein the at least a Jamb 1 is used as a window connector.

27. The construction system of claim 26, wherein the at least a Jamb 1 rests on the top slip-on connector of the at least an architectural piece.

28. The construction system of claim 27, wherein the at least a Jamb 1 has a slot or guide.

29. The construction system of claim 28, wherein the slot or guide of the at least a Jamb 1 also connects walls, windows, and door openings.

30. The construction system of claim 17, wherein the Jamb 1 has dimensions that are 2.20 m (7.21 feet) long, 0.10 m (0.32 feet) high.

31. The construction system of claim 17, wherein the at least a Jamb 2 has two slots or guides.

32. The construction system of claim 31, wherein the at least a Jamb 2 works as a base for the beginning of the construction of a wall.

33. The construction system of claim 17, wherein the Jamb 2 has dimensions that are 2.20 m (7.21 feet) long, 0.10 m (0.32 feet) high.

34. The construction system of claim 17, wherein the at least an architectural piece can be assembled to form a partition unit joined to a structural column.

35. The construction system of claim 17, wherein the at least a paver is suitable for floor and pavement construction for light vehicular and pedestrian traffic.

36. The construction system of claim 35, wherein the at least a paver may be smooth or may have different tactile finishes on their exposed face, grids, cylinders, guides, lines, and any other geometric or non-geometric shape.

37. The construction system of claim 17, wherein the paver has dimensions of 0.40 m (1.31 feet) long, 0.40 m (1.31 feet) wide, and 0.05 m (0.16 feet) high.

38. The construction system of claim 37, wherein the paver may be rectangular, circular, triangular, hexagonal, pentagonal, and any and other geometric shape.

39. The construction system architectural piece of claim 17, wherein the at least an architectural piece, the at least a Jamb 1, the at least a Jamb 2 and the at least a paver are configured for manufacturing of buildings, facilities, shelters, accessories, and housing products such as dividing walls, pavers, pillars, fence-posts, tablets, bricks, baffles, window frames, blocks, floors, pavement, or any other construction object.

40. The construction system of claim 17, wherein is resistant to the outdoors, resistant to humidity, immune to insects, immune to rodents, immune to microorganisms, anticorrosive, decomposition proof, thermal isolating, acoustic isolating, electric isolating, impact resistant, traction resistant, and bending resistant, fireproof, and eco-friendly.

41. The construction system of claim 17, wherein the at least an architectural piece, the at least a Jamb 1, the at least a Jamb 2 and the at least a paver are configured for easy assembly and manufactured with recycled or recovered plastic that do not require maintenance, having an easy and fast installation, ease of fabrication, they can be cut, drilled, nailed or pierced, and be plastered, painted, or plated.

42. The construction system of claim 17, wherein the at least an architectural piece, the at least a Jamb 1, the at least a Jamb 2 and the at least a paver do not require maintenance, do not require skilled workforce for its construction.

* * * * *